United States Patent
Foss et al.

[11] Patent Number: 5,921,091
[45] Date of Patent: Jul. 13, 1999

[54] LIQUID AIR FOOD FREEZER AND METHOD

[75] Inventors: John Foss, Mission Viejo; Mike Mitcheltree, Diamond Bar, both of Calif.; Pascal Schvester, Ratingen, Germany; Kent Renz, Berwin; Joseph E. Paganessi, Burr Ridge, both of Ill.; Lisa D. Hunter, Newport Beach, Calif.; Reena V. Patel, Denver; Darrin Baumunk, Highlands Ranch, both of Colo.

[73] Assignee: American Air Liquide, Incorporated, Walnut Creek, Calif.

[21] Appl. No.: 08/943,332

[22] Filed: Oct. 3, 1997

Related U.S. Application Data

[63]ntinuation-in-part of application No. 08/729,228, Oct. 9, 1996., abandoned

[51] Int. Cl.$^6$ .................................................. F25D 13/06
[52] U.S. Cl. ............................ 62/63; 62/46.1; 62/52.1; 62/64; 62/374
[58] Field of Search .............................. 62/63, 64, 374, 62/52.1, 239, 78

[56] References Cited

U.S. PATENT DOCUMENTS

| | | |
|---|---|---|
| 1,865,168 | 6/1932 | Buhr . |
| 2,479,840 | 8/1949 | Johnson et al. ............................ 62/239 |
| 2,677,943 | 5/1954 | Nelson et al. . |
| 3,187,514 | 6/1965 | Rendos ........................................ 62/63 |
| 3,269,133 | 8/1966 | Dixon ....................................... 62/52.1 |
| 3,287,925 | 11/1966 | Kane et al. ............................... 62/52.1 |

(List continued on next page.)

FOREIGN PATENT DOCUMENTS

| | | |
|---|---|---|
| 0 605 147 A2 | 7/1994 | European Pat. Off. . |
| 0 667 500 A1 | 8/1995 | European Pat. Off. . |
| 0 667 501 A1 | 8/1995 | European Pat. Off. . |
| 0 667 502 A1 | 8/1995 | European Pat. Off. . |
| 0 667 503 A1 | 8/1995 | European Pat. Off. . |
| 0667500 | 8/1995 | European Pat. Off. . |
| 0667501 | 8/1995 | European Pat. Off. . |
| 2 134 238 | 1/1984 | United Kingdom . |

OTHER PUBLICATIONS

"Cyro Shield System Equipment Specification" (Model JE–U3A Freeze Flight IQF System), Liquid Carbonic.
"48–3 Tier Freeze Tunnel (Model 1–550003–48)", Cardox, Division of Chemetron Corp., No. 1093, Dec. 14,1993.
"The new °KwikFreeze tumbler: IQF food freezing just got a little easier", Airco Kryofoods.
"Crust Flow The UQF Freezing System", Liquid Air, No. 1071/72 A.
"Liquid Nitrogen Immersion Freezers CIF–300 Series", Koach Freezing Systems.

*Primary Examiner*—Ronald Capossela
*Attorney, Agent, or Firm*—Burns, Doane, Swecker & Mathis, L.L.P.

[57] ABSTRACT

A cryogenic freezing method uses a mixture of liquid nitrogen and liquid oxygen in amounts approximating the composition of atmospheric air to freeze food products. The mixture preferably includes 18% to 25% oxygen and the balance nitrogen, with small amounts of residuals which are commonly found in air. The present invention involves replacing a liquid carbon dioxide or liquid nitrogen cooling medium which is used in known cryogenic freezers with a liquid nitrogen and liquid oxygen mixture. The liquid nitrogen and oxygen mixture can be used according the present invention in many of the known freezers using liquid carbon dioxide or liquid nitrogen as a cooling medium, including tunnel freezers, spiral freezers, and immersion freezers. The use of a liquid nitrogen and liquid oxygen mixture improves the efficiency of a freezer because the cold vapors are not exhausted from the freezer. In addition, the leakage of vapors from the freezer into the room air will not create unsafe conditions for workers.

25 Claims, 1 Drawing Sheet

U.S. PATENT DOCUMENTS

| | | |
|---|---|---|
| 3,553,973 | 1/1971 | Moran . |
| 3,605,434 | 9/1971 | Boese . |
| 3,708,995 | 1/1973 | Berg . |
| 3,813,895 | 6/1974 | Klee et al. . |
| 3,892,104 | 7/1975 | Klee et al. . |
| 3,952,540 | 4/1976 | Okada et al. . |
| 4,157,018 | 6/1979 | Goltsos . |
| 4,475,351 | 10/1984 | Klee . |
| 4,481,782 | 11/1984 | Mukerjee . |
| 4,726,195 | 2/1988 | Klee . |
| 4,726,766 | 2/1988 | Stewart et al. . |
| 4,757,691 | 7/1988 | Compagnon . |
| 4,803,851 | 2/1989 | Stokes . |
| 4,833,892 | 5/1989 | Wassibauer et al. ........................ 62/78 |
| 4,882,176 | 11/1989 | Koyama et al. . |
| 4,912,943 | 4/1990 | Hubert et al. . |
| 5,335,503 | 8/1994 | Lee . |
| 5,335,504 | 8/1994 | Durr et al. . |
| 5,343,714 | 9/1994 | Kiczek et al. . |
| 5,343,715 | 9/1994 | Lang . |
| 5,351,495 | 10/1994 | Lermuzeaux . |
| 5,454,232 | 10/1995 | Lermuzeaux . |
| 5,729,983 | 3/1998 | Garrett et al. ............................. 62/64 |

LIQUID AIR FOOD FREEZER AND METHOD

The present application is a Continuation-in-Part of U.S. Ser. No. 08/729,228, filed Oct. 9, 1996, now abandoned.

BACKGROUND OF THE INVENTION

1. Field of the Invention

The invention relates to a cryogenic freezer for freezing food products using liquid air. More particularly, the invention relates to a freezing apparatus and a method of freezing food products which uses a combination of liquid nitrogen and liquid oxygen as a cooling medium and avoids the need for continuously exhausting vapors from the freezer.

2. Description of the Related Art

Food chilling and freezing on a commercial scale has been achieved by freezer designs employing mainly either liquid carbon dioxide, carbon dioxide "snow," or liquid nitrogen. However, these carbon dioxide or liquid nitrogen systems have inherent disadvantages in that nitrogen or carbon dioxide gases must be exhausted out of the freezer. The exhausting of cold exhaust gases from the freezer reduces the efficiency of the freezer. In addition, in both carbon dioxide and liquid nitrogen systems the leakage of exhaust gases into the room air may create unsafe conditions for workers.

Individually quick frozen ("IQF") food products refer to food products which are frozen individually prior to packaging, as opposed to products which are frozen in clumps or blocks. Examples of such IQF products include hamburger patties, fruits, vegetables, diced ham, chicken pieces and patties, shrimp, and scallops. Products frozen by IQF freezing techniques offer advantages over block freezing methods because these products can be used in the amount desired and the unused portion can be returned to the freezer for later use.

Different types of apparatus are known to be used for freezing of IQF food products including straight tunnel freezers, liquid nitrogen immersion freezers, carbon dioxide flighted freezers, carbon dioxide tumbling freezers, and mechanical chilled fluidized bed freezers. Each of these types of freezers, with the exception of mechanical freezers, uses either liquid carbon dioxide or liquid nitrogen as a cooling medium.

A traditional means of cryogenic freezing is through the use of what is referred to as a straight tunnel freezer. This process uses a conveyor belt that runs through an enclosed freezer. The product travels on the belt through the freezer. As the product travels, it is sprayed directly with cryogen and is cryogenically frozen. Typical cryogens used are liquid carbon dioxide (−110° F., −79° C.) and liquid nitrogen (−320° F., −196° C.). The large difference in temperature between the product and the gaseous atmosphere in the freezer causes a quick heat exchange and results in fast freezing of the product. Because of this quick freeze, or cryogenic freeze, it is known that there is less cell damage in the product and thus less product damage. In the straight tunnel freezer, there are usually several top mounted fans blowing down on the product causing the thin layer of warm air surrounding the product to be removed and replaced with the colder cryogen gases. This results in a quick transfer of heat from the product. This process works well with products that are large, mostly dry, and can be placed on the belt separated from each other so that they cannot freeze together.

The utilization of liquid carbon dioxide or liquid nitrogen in a straight tunnel freezer requires that the gaseous vapors be exhausted from the freezer. With liquid nitrogen freezers it is important to monitor the oxygen content of the area surrounding the freezer where workers are present to assure that the oxygen content of the air does not drop below a safe level of 18%. With liquid carbon dioxide freezers the concentrations of carbon dioxide in the room must be monitored to make sure they do not exceed tolerable exposure concentrations. An additional drawback of straight tunnel freezers is that the cooling capacity of the liquid carbon dioxide or liquid nitrogen is not fully used when the cold gaseous nitrogen or carbon dioxide vapors are exhausted from the freezer, thus reducing the efficiency of the freezer.

Tunnel freezers of other shapes, such as spiral or multilayer, are also known which have some space savings and increased efficiency over straight tunnel freezers due to their more compact shapes. These other types of tunnel freezers have the same disadvantages as the straight tunnel freezers due to the use of liquid carbon dioxide or liquid nitrogen as a cooling medium.

The liquid nitrogen immersion freezer manufactured by Koach Engineering is a relatively compact device which provides freezing quickly and in a short distance by direct immersion of food product in liquid nitrogen. With this freezer, the product travels on a belt in a downward inclined direction into a bath of liquid nitrogen at −320° F. (−196° C.) where the partial fluidization and crusting of the product immediately take place. The product then travels in an upwardly inclined direction out of the freezer. This is the fastest form of individual quick freezing available. If the product particles are not touching each other when freezing, the product will be individually quick frozen. In addition, products can be of varying sizes and shapes and little floor space is required for this freezer because of the low operating temperature.

Efficiency of a liquid nitrogen immersion freezer can be improved by adding a postcooling tunnel to extract BTU's from the unused nitrogen vapors. A postcooling tunnel is a straight tunnel that pulls in the cold vapors being exhausted by the immersion freezer and recirculates them around the product, further cooling the frozen product.

The liquid nitrogen immersion freezer is subject to the same reduced efficiency and safety concerns associated with the use of liquid nitrogen which were discussed with respect to the tunnel freezers. In addition, this freezing method does not use the chilling potential of the gas vapors and thus more significantly decreases the efficiency. Even if a postcooling tunnel is used to improve the efficiency of the system, a substantial amount cooling ability of the cold nitrogen vapor is lost due to the need to exhaust these vapors.

The carbon dioxide flighted freezer made mainly by Liquid Carbonic Corporation provides a series of conveyor belts covered with a thin bed of carbon dioxide "snow." At the entrance end of the flighted freezer, there is a crust freezing zone where the product is sprayed with liquid carbon dioxide. The sprayed carbon dioxide creates a bed of dry ice snow in which the product travels along through the freezer. This bed of dry ice sublimes to help further freeze the product. The freezer tunnel has a series of belts which run at upward inclines. These inclined belt segments successively drop the food onto the next lower belt segment, dropping and tumbling the product and carbon dioxide snow together through the freezer. The purpose of these successive drops is to break apart product that is frozen together. Unfortunately, this is not always successful and the impact created from the drop does not always separate the product that has frozen together. The fans above the belt attempt to remove heat from the product and sublime the carbon dioxide snow before it exits the freezer.

Additional drawbacks of the carbon dioxide flighted freezer include the fact that carbon dioxide is the only expendable refrigerant that can be used with this process. Excess solid carbon dioxide snow on the belt that does not sublime before it exits the freezer may be packaged with the product. This packaged carbon dioxide can expand in the package causing the package to burst. Product breakage is also a common occurrence in this freezer due to the tumbling action of the product. Inefficiency and inconsistent product quality are additional drawbacks of the carbon dioxide flighted freezer. In addition, the amount of floor space and equipment required to produce large production in a flighted freezer can be a disadvantage when space constraints and equipment costs at a production facility are a consideration.

The carbon dioxide tumbler made by AirCo. includes a long rotating cylindrical drum set on an angle and fed by a conveyor belt which loads product directly into the rotating drum. Baffles inside the rotating drum lift and spill the product and direct the product towards the exit end of the freezer. Liquid carbon dioxide is also injected into the tumbler near the entrance and provides a tumbling bed of carbon dioxide snow for the product to travel in. The disadvantages of this method are similar to the disadvantages of the carbon dioxide flighted freezer in that the product tends to break as it tumbles through the rotating drum freezer and that excess carbon dioxide snow is packaged with the product resulting in package breakage. Additionally, due to very little shearing action within the process, product may stick and accumulate on the inner surfaces of the drum. Furthermore, the cool carbon dioxide gas vapors are not used efficiently due to the lack of ventilated gas movement.

All of the freezers which have been described above have the drawbacks associated with the use of liquid nitrogen or liquid carbon dioxide as a cooling agent. These freezers all require the continuous exhausting of the gaseous vapors which causes loss of efficiency and safety concerns due to possible leaks in the freezers.

The mechanical chilled fluidized bed freezers which are manufactured mainly by Frigoscandia, York and Ross, employ a freon or ammonia cooling system for cooling the air within the freezer through which the food products pass on a conveyor. The food product is levitated by using fans or blowers which force mechanically refrigerated air upward through the conveyor belt. This creates a "fluidized" bed of cold air around the product which promotes heat transfer and thus individually quick freezes the product. Advantages of mechanical freezing are the low operating cost, high production rates, and efficiency due to recirculation of cold gases.

The main drawbacks of the mechanical fluidized bed freezer include the fact that product needs to be lightweight, of uniform shape, and small size for the true fluidization to occur. In addition, the complexity of the system usually requires special attention for installation and maintenance. Furthermore, frequent downtime is required to defrost the ice build-up on condensation coils inside the mechanical freezer. Other drawbacks include high capital investment, inflexibility of increased or decreased production requirements and clumping if the product is not properly fed into the freezer.

In addition to this literature largely dedicated to processes and apparatuses implementing liquid nitrogen or liquid carbon dioxide, it has been proposed to use liquid air as a cryogenic liquid refrigerant in cryogenic food freezers (see for example U.S. Pat. No. 4,475,351 and U.S. Pat. No. 4,726,195).

One of the problems raised by handling such liquid air atmospheres comes from the fact that nitrogen is more volatile than oxygen, leaving a liquid enriched in oxygen, causing both risks of unsafe environmental conditions for workers around, and risks of detonation when this oxygen-enriched atmosphere comes in contact with a combustible or ignition source.

U.S. Pat. No. 4,726,195, cited above, offers a solution to those technical problems, wherein the liquid air is introduced inside the refrigeration zone of the freezer through a specific injector allowing that essentially all of the liquid cryogen is fully vaporized before contacting the product. Ensuring a full vaporization of both the nitrogen and the more slowly evaporating oxygen, before the liquid comes into contact with the products, eliminates the risks of detonation and unsafe working conditions for workers within the room in which the freezer is located.

This document has therefore made the choice of a freezing process using a cold gas.

SUMMARY OF THE INVENTION

The present invention provides an improved cryogenic freezer which addresses the problems listed above. The method according to the present invention provides improved efficiency and improved safety over the carbon dioxide and nitrogen methods, but also over the available liquid air processes.

According to one aspect of the invention, a method of freezing food products with liquid air includes supplying food products to a freezing chamber, and cooling the food products by injecting liquid nitrogen and liquid oxygen into the freezing chamber in amounts which approximate the composition of atmospheric air, an oxygen level being sensed by at least one oxygen level sensor and the ratio of liquid nitrogen to liquid oxygen being controlled in response to the oxygen level sensed by the sensor.

According to another aspect of the invention, a method of freezing food products with liquid air includes providing a bath of liquid nitrogen and liquid oxygen in amounts which approximate the composition of atmospheric air, freezing food products by immersing the food products in the bath of liquid nitrogen and liquid oxygen, sensing an oxygen level, at at least one location inside the freezing chamber or within the room in which the freezing chamber is located, and using the oxygen level information previously acquired to control the mixture of liquid nitrogen and liquid oxygen by modifying, when necessary, the flow rate of liquid nitrogen and/or the flow rate of liquid oxygen.

In accordance with another aspect of the present invention a freezing apparatus includes a freezing chamber, means for transporting food products through the freezing chamber, means for injecting a mixture of liquid nitrogen and liquid oxygen into the freezing chamber to cool the food products, means for sensing an oxygen level and means for controlling the mixture of liquid nitrogen and liquid oxygen in response to an output of the oxygen level sensor.

BRIEF DESCRIPTION OF THE DRAWING FIGURES

The invention will be described in greater detail with reference to the accompanying drawings in which like elements bear like reference numerals, and wherein:

FIG. 1 is a schematic side view of a straight tunnel freezer according to a first embodiment of the present invention; and FIG. 2 is a schematic side view of an immersion freezer according to a second embodiment of the present invention.

DETAILED DESCRIPTION

The present invention relates to a cryogenic freezing method in which a mixture of liquid nitrogen and liquid oxygen in amounts approximating the composition of atmospheric air is used to freeze food products. The mixture includes at least 18% oxygen, which is the minimum desired amount of oxygen for rooms in which people are present. The mixture preferably includes 18% to 25% oxygen (−297° F., −183° C.) and the balance nitrogen (−320° F., −196° C.) with small amounts of residuals which are commonly found in air. The residuals may include Ar, Kr, Ne, He, etc. The present invention involves replacing the liquid carbon dioxide or liquid nitrogen cooling medium which is used in known cryogenic freezers with the liquid nitrogen and liquid oxygen mixture.

The liquid nitrogen and oxygen mixture can be used according the present invention in many of the known freezers using liquid carbon dioxide or liquid nitrogen as a cooling medium, including tunnel freezers, spiral freezers, immersion freezers, and most other carbon dioxide or nitrogen freezing systems.

Figure 1:
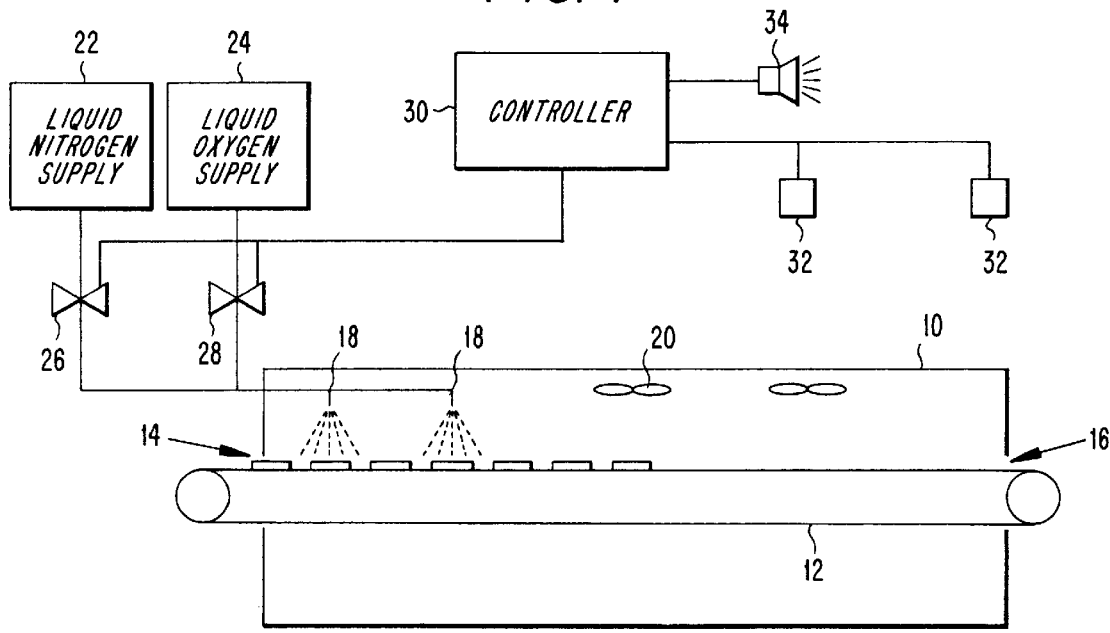

An example of a straight tunnel freezer according to the present invention is illustrated in FIG. 1. The straight tunnel freezer includes an elongated freezer tunnel 10 and a conveyor 12 on which a food product is transported from a freezer entrance 14 to a freezer exit 16. One or more coolant nozzles 18 are provided within tunnel 10, preferably near the entrance of the tunnel. Coolant nozzles 18 preferably direct the mixture of liquid nitrogen and liquid oxygen directly onto the product. Alternatively, coolant nozzles 18 may be provided in tunnel 10 without directing the coolant directly on the food product. In this case, the cool air within tunnel 10 is circulated around the food product by means of fans or blowers. One or more fans 20 may also be provided within tunnel 10 either above, below or at a side of conveyor belt 12 for circulating the cold gases within the freezer.

The amount of liquid provided from a liquid nitrogen supply 22 and a liquid oxygen supply 24 are controlled by nitrogen and oxygen flow control valves 26, 28. Valves 26, 28 may be controlled by a controller 30 to achieve the desired cryogenic mixture, preferably of 18% to 25% oxygen. Valves 26, 28 may also be controlled manually.

In order to assure safe working conditions for workers within the room in which the freezer is located, one or more oxygen level sensors 32 are preferably provided within the room. Instead of being located within the room in which the freezing chamber is located, an information of oxygen level could also be taken at one or more locations inside the freezing chamber.

The information from these oxygen level sensors 32 may be used by controller 30 to control the mixture of nitrogen and oxygen by varying, when necessary, the flow rates with valves 26, 28. Preferably, an alarm 34 is provided which is activated by controller 30 when the oxygen level in the room drops below acceptable levels.

In the embodiment of FIG. 1, the mixture of nitrogen and oxygen is mixed by valves 26, 28 just prior to use in freezer tunnel 10. The mixture may also be mixed within freezer tunnel 10 by providing two separate nozzles for liquid nitrogen and liquid oxygen. According to an alternative embodiment, the mixture may be premixed rather than mixed at the entrance to the freezer. However, degradation of a pre-mixed liquid will occur as a function of both pressure and time. The oxygen concentration of a premixed liquid will continue to increase over time and the rate of change will increase with higher pressure. Therefore, for safety reasons a premixed product would preferably be mixed at an on-site plant.

Figure 2:
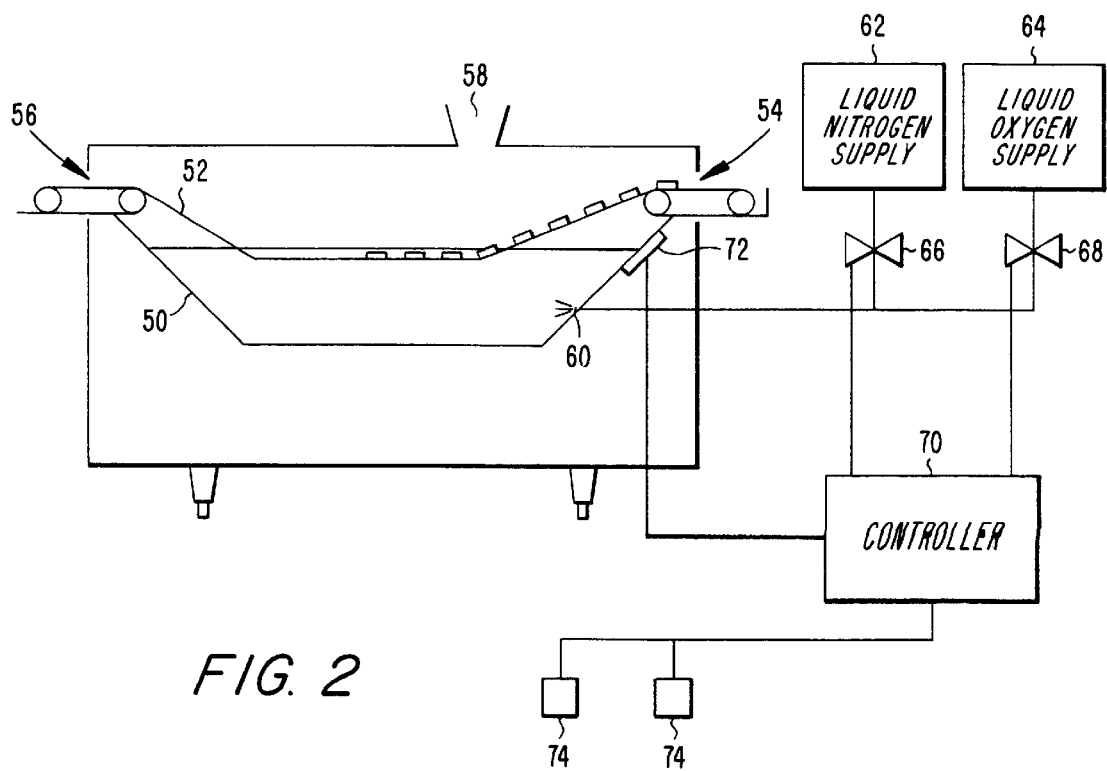

According to a second embodiment of the invention, illustrated in FIG. 2, a liquid air immersion freezer includes a bath including a mixture of liquid nitrogen and liquid oxygen. The liquid air immersion freezer includes a bath 50 and a conveyor belt 52 which carries the food product into and out of the bath. The food product travels from a freezer entrance 54 on an inclined portion of conveyor belt 52 into the liquid nitrogen and liquid oxygen bath. The food product is frozen in seconds by the direct immersion in the cold liquid. The food product then travels out of the bath to a freezer exit 56 on an inclined portion of conveyor belt 52. The food product may also be introduced to the freezer by dropping the product directly into the bath through an opening 58 in the top of the freezer.

The liquid nitrogen and liquid oxygen are delivered to bath 50 through a liquid delivery port 60. A liquid nitrogen supply 62 and a liquid oxygen supply 64 are provided with valves 66, 68, as in the embodiment of FIG. 1. The mixture of the liquids is preferably controlled by a controller 70. Controller 70 also may be used to control the level of the liquid bath which is measured by a level indicator 72 and automatically maintained just above conveyor belt 52.

If FIG. 2 illustrates a mode where the liquid nitrogen and the liquid oxygen are mixed on site, just prior to being delivered to the bath by one port 60, we could also adopt, according to the invention, a configuration where the liquid nitrogen and the liquid oxygen are delivered to the bath by two separate ports.

As in the tunnel freezer of FIG. 1, the immersion freezer is operated in a controlled environment in which the oxygen levels of the air in the room and/or at one or more locations inside the freezing chamber are continuously monitored, for example by oxygen level sensors 74, and the nitrogen/oxygen mixture is controlled according to the sensed oxygen levels.

Depending on the specific freezing application and the available space, the immersion freezer of FIG. 2 may include precooling and/or a post cooling tunnel to expand the capacity and improve the efficiency of the freezer. The advantages of the liquid air immersion freezer over the liquid nitrogen immersion freezer include improved efficiency because the cold nitrogen vapors do not have to be exhausted from the freezer. In addition, the liquid air freezer can be operated more safely without concern of nitrogen leaking from the freezer and causing unsafe working conditions.

Although the present invention has been described as used in a tunnel type freezer and an immersion freezer, it will be recognized by those in the art that the liquid nitrogen and liquid oxygen mixture can be used in other types of freezers with the same beneficial results.

While the invention has been described in detail with reference to a preferred embodiment thereof, it will be apparent to one skilled in the art that various changes can be made, and equivalents employed without departing from the spirit and scope of the invention.

What is claimed is:

1. A method of freezing food products with liquid air comprising:
   supplying food products to a freezing chamber;
   cooling the food products by injecting liquid nitrogen and liquid oxygen into the freezing chamber, in amounts which approximate the composition of atmospheric air;
   sensing an oxygen level, at at least one location inside the freezing chamber or within the room in which the freezing chamber is located; and
   using the oxygen level information previously acquired to control the mixture of liquid nitrogen and liquid oxygen by modifying, when necessary, the flow rate of liquid nitrogen and/or the flow rate of liquid oxygen.

2. A method of freezing food products according to claim 1, wherein the mixture of liquid nitrogen and liquid oxygen which is injected into the freezing chamber includes at least 18% oxygen.

3. A method of freezing food products according to claim 1, wherein the mixture of liquid nitrogen and liquid oxygen which is injected into the freezing chamber includes 18% to 25% oxygen.

4. A method of freezing food products according to one of claims 1 to 3, wherein the liquid nitrogen and liquid oxygen are injected into the freezing chamber by two separates nozzles which spray the liquid nitrogen and liquid oxygen on a food product passing through the chamber.

5. A method of freezing food products according to one of claims 1 to 3, wherein the liquid nitrogen and liquid oxygen are mixed on-site, just prior to being injected into the freezer.

6. A method of freezing food products according to one of claims 1 to 5, wherein an alarm is activated if the oxygen level falls below a safe level.

7. A method of freezing food products according to claim 1, wherein the liquid nitrogen and liquid oxygen which are injected into the freezing chamber form a liquid bath, and the food products are frozen by immersion in the liquid bath.

8. A method of freezing food products with liquid air comprising:
   supplying liquid nitrogen and liquid oxygen to a freezing chamber to form a bath of liquid nitrogen and liquid oxygen in amounts which approximate the composition of atmospheric air;
   freezing food products by immersing the food products in the bath of liquid nitrogen and liquid oxygen;
   sensing an oxygen level, at at least one location inside the freezing chamber or within the room in which the freezing chamber is located; and
   using the oxygen level information previously acquired to control the mixture of liquid nitrogen and liquid oxygen by modifying, when necessary, the flow rate of liquid nitrogen and/or the flow rate of liquid oxygen.

9. A method of freezing food products according to claim 8, wherein the bath of liquid nitrogen and liquid oxygen includes 18% to 25% oxygen.

10. A method of freezing food products according to claim 8 or 9, wherein the liquid nitrogen and liquid oxygen are delivered to the bath by two separate ports.

11. A method of freezing food products according to claim 8 or 9, wherein the liquid nitrogen and liquid oxygen are mixed on-site, just prior to being delivered to the bath by one port.

12. A freezing apparatus comprising:
   a freezing chamber;
   means for transporting food products through the freezing chamber;
   means for injecting a mixture of liquid nitrogen and liquid oxygen into the freezing chamber to cool the food products;
   at least one oxygen level sensor, capable of sensing an oxygen level at at least one location inside the freezing chamber or within the room in which the freezing chamber is located; and
   means for controlling the mixture of liquid nitrogen and liquid oxygen by modifying, when necessary, the flow rate of liquid nitrogen and/or the flow rate of oxygen, based on an output of said at least one oxygen level sensor.

13. The freezing apparatus according to claim 12, further comprising means for mixing the liquid nitrogen and liquid oxygen in amounts which approximate the composition of air.

14. The freezing apparatus according to claim 12, further comprising a liquid nitrogen supply and a liquid oxygen supply.

15. A method of freezing food products with liquid air comprising:
   supplying food products to a freezing chamber; and
   cooling the food products by injecting liquid nitrogen and liquid oxygen into the freezing chamber in amounts which approximate the composition of atmospheric air;
   controlling the ratio of liquid nitrogen to liquid oxygen when necessary to approximate the composition of atmospheric air.

16. The method of claim 15, wherein the mixture of liquid nitrogen and liquid oxygen which is injected into the freezing chamber includes at least 18% oxygen.

17. The method of claim 15, wherein the mixture of liquid nitrogen and liquid oxygen which is injected into the freezing chamber includes 18% to 25% oxygen.

18. The method of claim 15, wherein the liquid nitrogen and liquid oxygen which are injected into the freezing chamber form a liquid bath, and the food products are frozen by immersion in the liquid bath.

19. The method of claim 15, wherein the liquid nitrogen and liquid oxygen are injected into the freezing chamber by nozzles which spray the liquid nitrogen and liquid oxygen on a food product passing through the chamber.

20. The method of claim 15, wherein the liquid nitrogen and liquid oxygen are mixed prior to being injected into the freezer.

21. A method of freezing food products with liquid air comprising:
   supplying food products to a freezing chamber; and
   cooling the food products by injecting liquid nitrogen and liquid oxygen into the freezing chamber in amounts which approximate the composition of atmospheric air;
   wherein an oxygen level is sensed by at least one oxygen level sensor, and the ratio of liquid nitrogen to liquid oxygen is controlled in response to the oxygen level sensed by the sensor.

22. The method of claim 21, further comprising activating an alarm when the oxygen level falls below a predetermined level.

23. A freezing apparatus comprising:
   a freezing chamber;
   means for transporting food products through the freezing chamber; and
   means for injecting a mixture of liquid nitrogen and liquid oxygen into the freezing chamber to cool the food products;

means for mixing the liquid nitrogen and liquid oxygen in amounts which approximate the composition of air; and a controller for varying the ratio of the mixture of liquid nitrogen and liquid oxygen.

24. The freezing apparatus of claim 23, further comprising a liquid nitrogen supply and a liquid oxygen supply.

25. The freezing apparatus of claim 23, further comprising oxygen level sensors, wherein the controller controls the mixture of liquid nitrogen and liquid oxygen based on an output of the oxygen level sensors.

* * * * *

UNITED STATES PATENT AND TRADEMARK OFFICE
CERTIFICATE OF CORRECTION

PATENT NO. : 5,921,091
DATED : July 13, 1999
INVENTOR(S) : John FOSS et al.

It is certified that error appears in the above-identified patent and that said Letters Patent is hereby corrected as shown below:

Column 7, Claim 1, line 8, please delete "at at least" and insert --at least--.

Column 7, Claim 4, line 25, please delete "separates" and insert --separate--.

Column 7, Claim 8, line 47, please "at at least" and insert --at least--.

Column 8, Claim 12, line 5, please delete "at at least" and insert --at least--.

Signed and Sealed this

Seventeenth Day of October, 2000

Attest:

Q. TODD DICKINSON

*Attesting Officer*          *Director of Patents and Trademarks*